US012756315B2

(12) United States Patent
Yoon et al.

(10) Patent No.: US 12,756,315 B2
(45) Date of Patent: Oct. 6, 2026

(54) BUCK-BOOST CONVERTER REDUCING INDUCTOR CURRENT

(71) Applicants: Silicon Mitus, Inc., Seongnam-si (KR); SILICON-MAGIC SEMICONDUCTOR TECHNOLOGY (HANGZHOU) CO., LTD., Hangzhou City (CN)

(72) Inventors: Kwang Ho Yoon, Seongnam-Si (KR); Su Hun Lim, Seongnam-Si (KR); Jin Su Jung, Goyang-Si (KR)

(73) Assignees: Silicon Mitus, Inc., Seongnam-Si (KR); SILICON-MAGIC SEMICONDUCTOR TECHNOLOGY (HANGZHOU) CO., LTD., Hangzhou (CN)

( * ) Notice: Subject to any disclaimer, the term of this patent is extended or adjusted under 35 U.S.C. 154(b) by 238 days.

(21) Appl. No.: 18/343,531

(22) Filed: Jun. 28, 2023

(65) Prior Publication Data

US 2023/0421063 A1 Dec. 28, 2023

(30) Foreign Application Priority Data

Jun. 28, 2022 (KR) ........................ 10-2022-0078743

(51) Int. Cl.
*H02M 3/158* (2006.01)
*H02M 1/00* (2006.01)

(52) U.S. Cl.
CPC ....... *H02M 3/1582* (2013.01); *H02M 1/0095* (2021.05)

(58) Field of Classification Search
CPC .......................... H02M 3/1582; H02M 1/0095
See application file for complete search history.

(56) References Cited

U.S. PATENT DOCUMENTS 9,595,871 B1 * 3/2017 Bayer ................. H02M 3/1582
2021/0391794 A1 * 12/2021 Somani ............... H02M 3/1582
2021/0408908 A1 * 12/2021 Lu ......................... H02M 3/158

* cited by examiner

*Primary Examiner* — Alex Torres-Rivera
(74) *Attorney, Agent, or Firm* — Osha Bergman Watanabe & Burton LLP

(57) ABSTRACT

A buck-boost converter includes a first switch connected between an input terminal that receives an input voltage and a first terminal of an inductor, a second switch connected between the first terminal of the inductor and an output terminal that outputs an output voltage, a third switch connected between a second terminal of the inductor and a ground terminal, and a fourth switch connected between the second terminal of the inductor and an inverting input terminal that receives an inverted input voltage obtained by inverting the input voltage.

12 Claims, 14 Drawing Sheets

BUCK-BOOST CONVERTER REDUCING INDUCTOR CURRENT

CROSS-REFERENCE TO RELATED APPLICATION

This application claims priority to Korean Patent Application No. 10-2022-0078743 filed on Jun. 28, 2022 and all the benefits accruing therefrom under 35 U.S.C. § 119, the contents of which are incorporated by reference in their entirety.

BACKGROUND

The present disclosure relates to a buck-boost converter. More specifically, the present disclosure relates to an inverting buck-boost converter capable of achieving high efficiency and reduced heat generation in a wide input/output voltage range by detecting an input/output voltage and changing a switching control method of a circuit according to an input/output voltage relationship, while reducing the overall area and cost of a system by using an inductor and a capacitor having physically smaller sizes than conventional ones.

The operation of a generally known inverting buck-boost converter is described as follows.

FIG. 1 is a diagram illustrating a buck-boost converter according to the prior art and FIG. 2 is an operation timing diagram of the buck-boost converter according to the prior art.

Referring to FIGS. 1 and 2, when a first switch SW1 is turned on and a second switch SW2 is turned off for charging, a voltage of a first terminal N1 of an inductor L rises to an input voltage $V_{IN}$, so that an inductor current $I_L$ gradually rises. When the second switch SW2 is turned on and the first switch SW1 is turned off for discharging, the voltage of the first terminal N1 of the inductor L falls to an output voltage $V_{OUT}$, so that the inductor current $I_L$ gradually falls.

Meanwhile, for such a conventional inverting buck-boost converter, when a boosting ratio increases to a certain level or more, the inductor current $I_L$ required for regulation of the output voltage $V_{OUT}$ and the resulting power loss increases rapidly, such that efficiency of the system decreases and heat generation increases.

In addition, an inductor L having a large inductance and an output capacitor $C_{OUT}$ having a large capacitance are required to cope with the increase in inductor current $I_L$, such that an area required for system configuration increases and the price thereof rises.

SUMMARY

The present disclosure provides an inverting buck-boost converter capable of achieving high efficiency and reduced heat generation in a wide input/output voltage range by detecting an input/output voltage and changing a switching control method of a circuit according to an input/output voltage relationship.

In addition, the present disclosure provides an inverting buck-boost converter capable of reducing the overall area and cost of a system by using an inductor and a capacitor having physically smaller sizes than conventional ones.

In accordance with a first aspect of the present application, a buck-boost converter includes a first switch connected between an input terminal that receives an input voltage and a first terminal of an inductor, a second switch connected between the first terminal of the inductor and an output terminal that outputs an output voltage, a third switch connected between a second terminal of the inductor and a ground terminal, and a fourth switch connected between the second terminal of the inductor and an inverting input terminal that receives an inverted input voltage obtained by inverting the input voltage.

In the buck-boost converter in accordance with the first aspect of the present application, during a first time, an inductor current in the inductor may gradually rise, when the first switch and the third switch may be turned on, and the second switch and the fourth switch may be turned off; thus a voltage of the first terminal of the inductor may rise to the input voltage, and a voltage of the second terminal of the inductor may be maintained at a ground level. During a second time following the first time, the inductor current may gradually fall, when the second switch and the fourth switch may be turned on, and the first switch and the third switch may be turned off; thus the voltage of the first terminal of the inductor may fall to the output voltage, and the voltage of the second terminal of the inductor may fall to the inverted input voltage.

In the buck-boost converter in accordance with the first aspect of the present application, when the input voltage is greater than an absolute value of the output voltage, during a third time, the inductor current gradually may rise, when the first switch and the third switch may be turned on, and the second switch and the fourth switch may be turned off: thus the voltage of the first terminal of the inductor may rise to the input voltage, and the voltage of the second terminal of the inductor may be maintained at the ground level. During a fourth time following the third time, the inductor current may gradually fall, when the second switch and the third switch may be turned on, and the first switch and the fourth switch may be turned off; thus the voltage of the first terminal of the inductor may fall to the output voltage, and the voltage of the second terminal of the inductor may be maintained at the ground level.

In the buck-boost converter in accordance with the first aspect of the present application, when the input voltage is less than the absolute value of the output voltage, during a fifth time, the inductor current may gradually rise, when the first switch and the third switch may be turned on, and the second switch and the fourth switch may be turned off; thus the voltage of the first terminal of the inductor may rise to the input voltage, and the voltage of the second terminal of the inductor may rise to the ground level. During a sixth time following the fifth time, the inductor current may gradually fall, when the second switch and the fourth switch may be turned on, and the first switch and the third switch may be turned off; thus the voltage of the first terminal of the inductor may fall to the output voltage, and the voltage of the second terminal of the inductor may fall to the inverted input voltage.

In accordance with a second aspect of the present application, a buck-boost converter includes a first switch connected between an input terminal that receives an input voltage and a first terminal of an inductor, a second switch connected between the first terminal of the inductor and an output terminal that outputs an output voltage, a third switch connected between a second terminal of the inductor and a ground terminal, a fourth switch connected between the second terminal of the inductor and an inverting input terminal that receives an inverted input voltage obtained by inverting the input voltage, and a controller configured to control a rising slope and a falling slope of an inductor current by adjusting operating timings of the third switch and the fourth switch according to a comparison result of the input voltage and an absolute value of the output voltage.

In the buck-boost converter in accordance with the second aspect of the present application, the controller may be configured to include a comparator configured to output a comparison result signal of the input voltage and an absolute value of the output voltage, an OR operation device configured to output a value, obtained by performing an OR operation of a control signal of the first switch and the comparison result signal, as a control signal of the third switch, and an AND operation device configured to output a value, obtained by performing an AND operation of a control signal of the second switch and an inverted comparison result signal obtained by inverting the comparison result signal, as a control signal of the fourth switch.

In the buck-boost converter in accordance with the second aspect of the present application, when the input voltage is less than the absolute value of the output voltage, the comparison result signal output by the comparator may be at a low level, the third switch may be switched in synchronization with the first switch, and the fourth switch may be switched in synchronization with the second switch.

In the buck-boost converter in accordance with the second aspect of the present application, when the input voltage is greater than the absolute value of the output voltage, the comparison result signal output by the comparator may be at a high level, and the third switch may be turned on during an entire operating time, and the fourth switch may be turned off during the entire operating time.

In the buck-boost converter in accordance with the second aspect of the present application, when the input voltage is greater than the absolute value of the output voltage, during a third time, the inductor current may gradually rise, when the controller may turn on the first switch and the third switch and turn off the second switch and the fourth switch to make a voltage of the first terminal of the inductor rise to the input voltage and maintain a voltage of the second terminal of the inductor at a ground level. During a fourth time following the third time, the inductor current may gradually fall, when the controller may turn on the second switch and the third switch and turn off the first switch and the fourth switch to make the voltage of the first terminal of the inductor fall to the output voltage and maintain the voltage of the second terminal of the inductor at a ground level.

In the buck-boost converter in accordance with the second aspect of the present application, when the input voltage is less than the absolute value of the output voltage, during a fifth time, the inductor current may gradually rise, when the controller may turn on the first switch and the third switch and turn off the second switch and the fourth switch to make a voltage of the first terminal of the inductor rise to the input voltage and make a voltage of the second terminal of the inductor rise to a ground level. During a sixth time following the fifth time, the inductor current may gradually fall, when the controller may turn on the second switch and the fourth switch and turn off the first switch and the third switch to make the voltage of the first terminal of the inductor fall to the output voltage and make the voltage of the second terminal of the inductor fall to the inverted input voltage.

In accordance with a third aspect of the present application, a buck-boost converter includes a first switch connected between an input terminal that receives an input voltage and a first terminal of an inductor, a second switch connected between the first terminal of the inductor and an output terminal that outputs an output voltage, a third switch and a fourth switch connected in series between the input terminal and a ground terminal, a charge pump capacitor connected between a third terminal, which is positioned between the third switch and the fourth switch, and a second terminal of the inductor, a charge pump switch connected between the second terminal of the inductor and a ground terminal, and a controller configured to control a rising slope and a falling slope of an inductor current by adjusting operating timings of the third switch, the fourth switch, and the charge pump capacitor according to a comparison result of the input voltage and an absolute value of the output voltage.

In the buck-boost converter in accordance with the third aspect of the present application, the controller may be configured to include a comparator configured to output a comparison result signal of the input voltage and an absolute value of the output voltage, an OR operation device configured to output a value, obtained by performing an OR operation of a control signal of the first switch and the comparison result signal, as a control signal of the third switch and the charge pump switch, and an AND operation device configured to output a value, obtained by performing an AND operation of a control signal of the second switch and an inverted comparison result signal obtained by inverting the comparison result signal, as a control signal of the fourth switch.

In the buck-boost converter in accordance with the third aspect of the present application, when the input voltage is less than the absolute value of the output voltage, the comparison result signal output by the comparator may be at a low level, and the third switch and the charge pump switch may be switched in synchronization with the first switch and the fourth switch may be switched in synchronization with the second switch.

In the buck-boost converter in accordance with the third aspect of the present application, when the input voltage is greater than the absolute value of the output voltage, the comparison result signal output by the comparator may be at a high level, and the third switch and the charge pump switch may be turned on during an entire operating time and the fourth switch may be turned off during the entire operating time.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
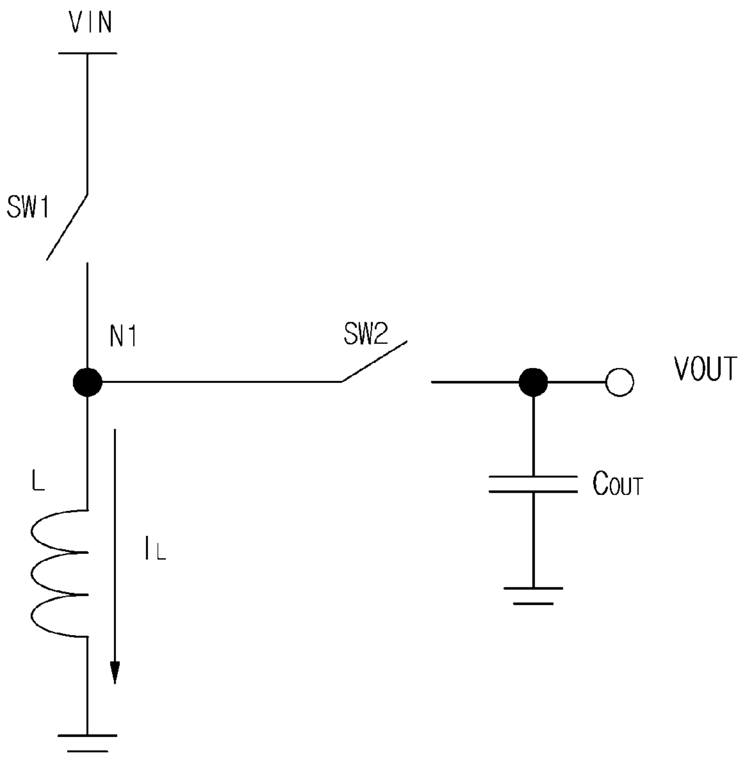
PRIOR ART FIG.1
FIG. 1 is a diagram illustrating an inverting buck-boost converter according to the prior art.
Figure 2:
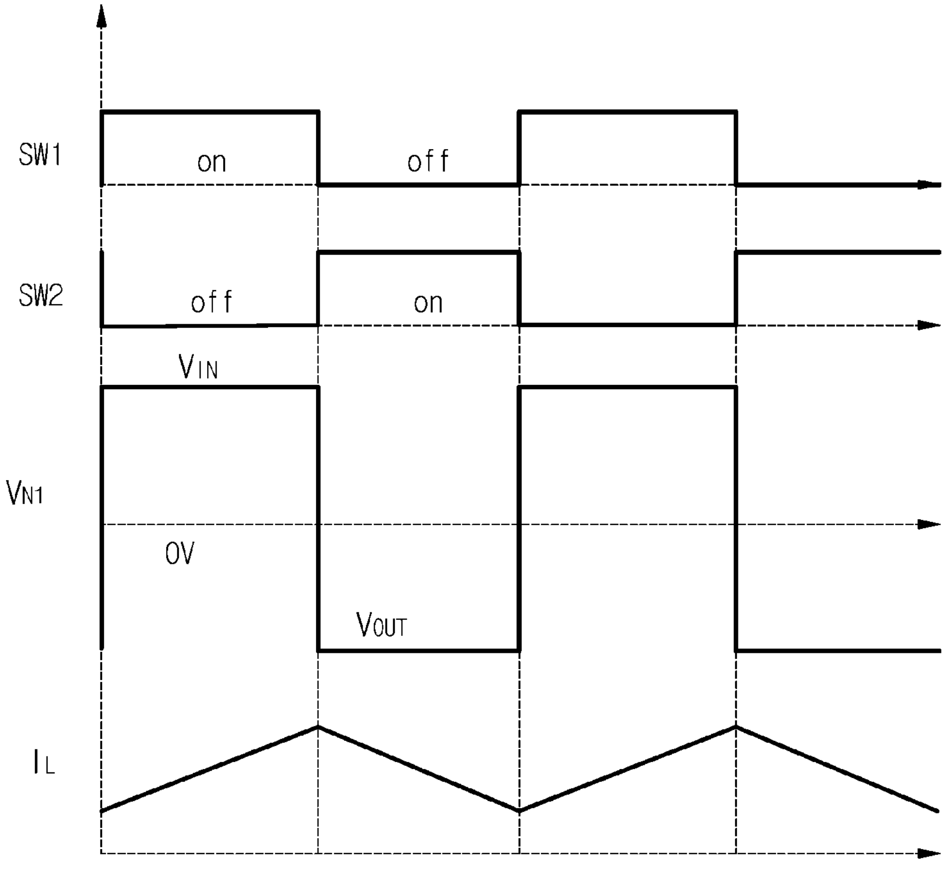
PRIOR ART FIG. 2
FIG. 2 is an operation timing diagram of the inverting buck-boost converter according to the prior art.

Specific structural or functional descriptions of embodiments according to the concept of the present application disclosed in this specification are only illustrated for the purpose of explaining the embodiments according to the concept of the present application, and the embodiments according to the concept of the present application may be embodied in various forms and should not be construed as limited to the embodiments set forth herein. Rather, these embodiments are provided so that this disclosure will be thorough and complete, and will fully convey the scope of the present application to those skilled in the art.

Various modifications may be made to the embodiments according to the concept of the present application and the embodiments may have various forms, and thus the embodiments are illustrated in the drawings and described in detail in this specification. However, this is not intended to limit the embodiments according to the concept of the present application to specific disclosure forms, and includes all modifications, equivalents, or substitutes included in the spirit and technical scope of the present application.

Unless otherwise defined, all terms used herein, including technical or scientific terms, have the same meaning as commonly understood by one of ordinary skill in the art to which the present application belongs. Terms such as those defined in commonly used dictionaries should be interpreted as having a meaning consistent with the meaning in the context of the prior art, and should not be interpreted in an ideal or excessively formal meaning unless explicitly defined in this specification.

Hereinafter, exemplary embodiments of the present application will be described in detail with reference to the accompanying drawings.

Figure 3:
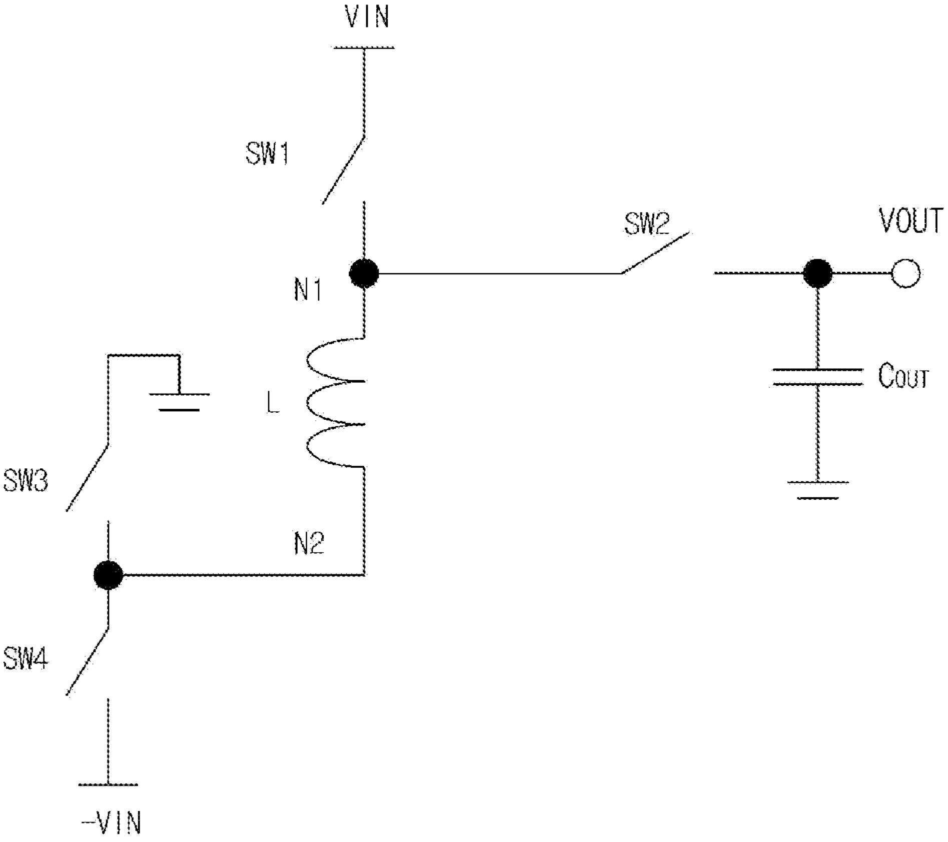
FIG. 3 is a diagram illustrating a buck-boost converter in accordance with a first exemplary embodiment of the present application.

FIG. 3 is a diagram illustrating a buck-boost converter in accordance with a first exemplary embodiment of the present application.

Referring to FIG. 3, the buck-boost converter in accordance with the first exemplary embodiment of the present application is configured to include an inductor L, an output capacitor $C_{OUT}$, a first switch SW1, a second switch SW2, and a third switch SW3, and a fourth switch SW4.

In one or more embodiments, the first switch SW1, the second switch SW2, the third switch SW3, and the fourth switch SW4 may be field effect transistors, but are not limited thereto.

The inductor L is connected in series between a connection terminal of the first switch SW1 and the second switch SW2 and a connection terminal of the third switch SW3 and the fourth switch SW4. That is, a first terminal N1 of the inductor L is connected to the connection terminal of the first switch SW1 and the second switch SW2, and a second terminal N2 of the inductor L is connected to the connection terminal of the third switch SW3 and the fourth switch SW4.

The output capacitor $C_{OUT}$ is connected between an output terminal $V_{OUT}$ from which an output voltage $V_{OUT}$ is output and a ground terminal. The first switch SW1 is connected between an input terminal $V_{IN}$ to which an input voltage $V_{IN}$ is input and the first terminal N1 of the inductor L. The second switch SW2 is connected between the first terminal N1 of the inductor L and the output terminal $V_{OUT}$ from which the output voltage $V_{OUT}$ is output. The third switch SW3 is connected between the second terminal N2 of the inductor L and a ground terminal. The fourth switch SW4 is connected between the second terminal N2 of the inductor L and an inverting input terminal $-V_{IN}$ to which an inverted input voltage $-V_{IN}$ obtained by inverting the input voltage $V_{IN}$ is input.

Hereinafter, a specific and exemplary operation configuration of the buck-boost converter in accordance with the first exemplary embodiment of the present application will be described.

For example, a configuration may be made such that 1) during a first time T1, the first switch SW1 and the third switch SW3 are turned on, the second switch SW2 and the fourth switch SW4 are turned off, and thus a voltage of the first terminal N1 of the inductor L rises to the input voltage $V_{IN}$ and a voltage of the second terminal N2 of the inductor L is maintained at a ground level, so that an inductor current $I_L$ gradually rises, and 2) during a second time T2 following the first time T1, the second switch SW2 and the fourth switch SW4 are turned on, the first switch SW1 and the third switch SW3 turned off, and thus the voltage of the first terminal N1 of the inductor L falls to the output voltage $V_{OUT}$ and the voltage of the second terminal N2 of the inductor L falls to the inverted input voltage $-V_{IN}$, so that the inductor current $I_L$ gradually falls.

Such an exemplary configuration will be described in more detail by referring further to FIG. 4.

Figure 4:
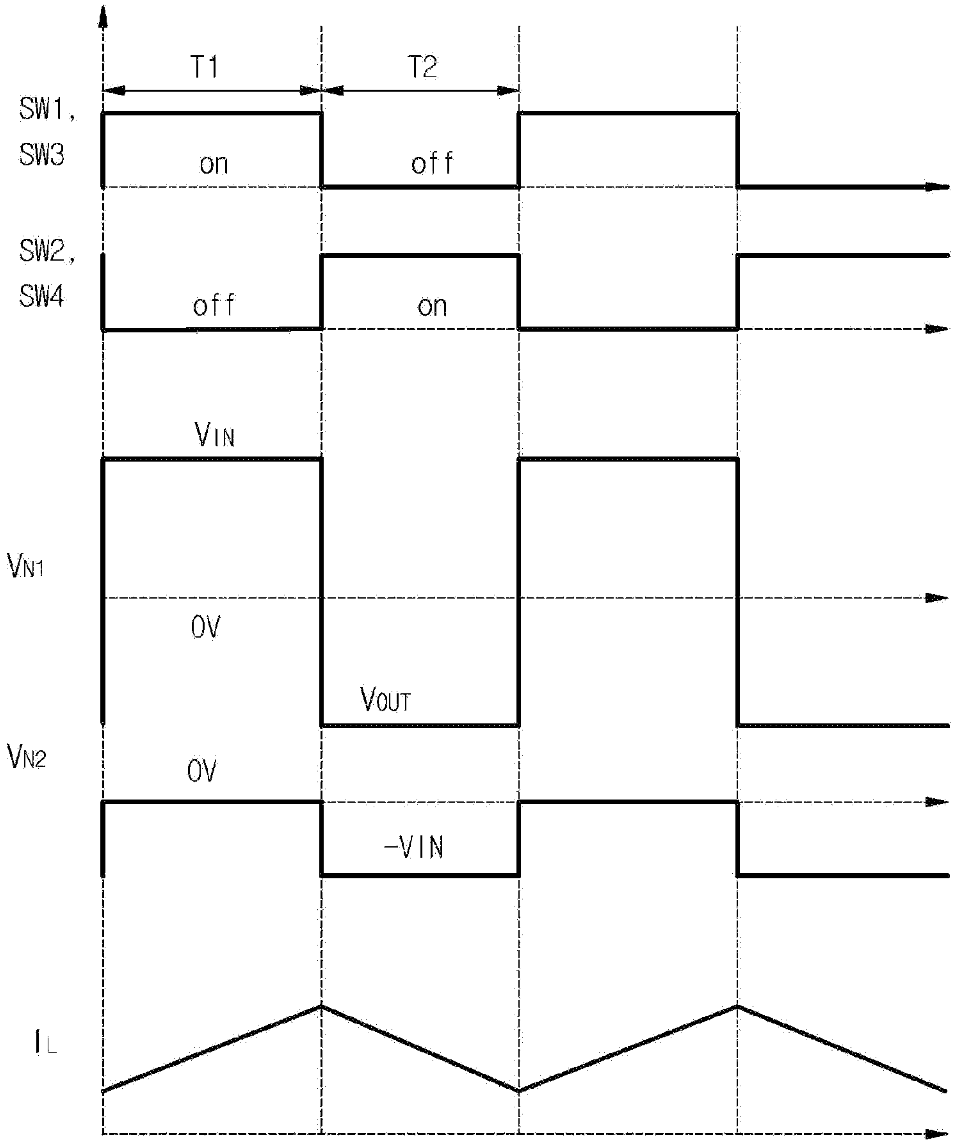
FIG. 4 is an exemplary operation timing diagram of the buck-boost converter in accordance with the first exemplary embodiment of the present application.

FIG. 4 is an exemplary operation timing diagram of the buck-boost converter in accordance with the first exemplary embodiment of the present application. In one or more embodiments, the operation timings of the first switch SW1, the second switch SW2, the third switch SW3, and the fourth switch SW4 are controlled by a control unit (not illustrated) to be turned on and off.

Further referring to FIG. 4, during the first time T1, the first switch SW1 and the third switch SW3 are turned on, and the second switch SW2 and the fourth switch SW4 are turned off. Accordingly, the voltage of the first terminal N1 of the inductor L connected to the input terminal $V_{IN}$ rises to the input voltage $V_{IN}$ and the voltage of the second terminal N2 of the inductor L connected to a ground terminal is maintained at a ground level, so that a process in which the inductor current $I_L$ gradually rises and the inductor L is charged with energy is performed.

During the second time T2 following the first time T1, the second switch SW2 and the fourth switch SW4 are turned on and the first switch SW1 and the third switch SW3 are turned off. Accordingly, the voltage of the first terminal N1 of the inductor L connected to the output terminal $V_{OUT}$ fall to the output voltage $V_{OUT}$ and the second terminal N2 of the inductor L connected to the inverting input terminal −VIN falls to the inverted input voltage $-V_{IN}$, so that a process in which the inductor current $I_L$ gradually falls and the energy charged in the inductor L is discharged is performed.

Hereinafter, by referring further to FIGS. 5 to 8, specific and exemplary operations of the buck-boost converter in accordance with the first exemplary embodiment of the present application will be described in connection with levels of the input voltage $V_{IN}$ and an absolute value of the output voltage $V_{OUT}$.

An operation when the input voltage $V_{IN}$ is greater than an absolute value of the output voltage $V_{OUT}$ will be described. In one or more embodiments, the operation timings of the first switch SW1, the second switch SW2, the third switch SW3 and the fourth switch SW4 are controlled by a control unit (not illustrated) to be turned on and off.

Figure 5:
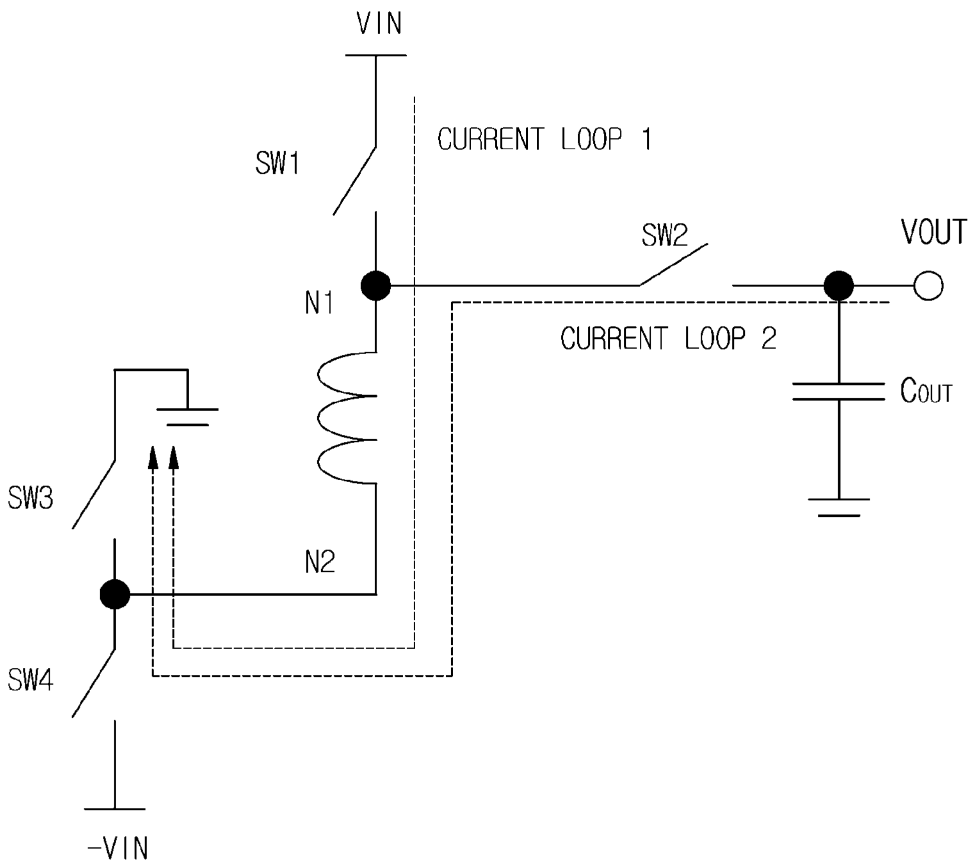
FIG. 5 is a diagram illustrating a current loop generated when an input voltage is greater than an absolute value of the output voltage in the buck-boost converter in accordance with the first exemplary embodiment of the present application.
Figure 6:
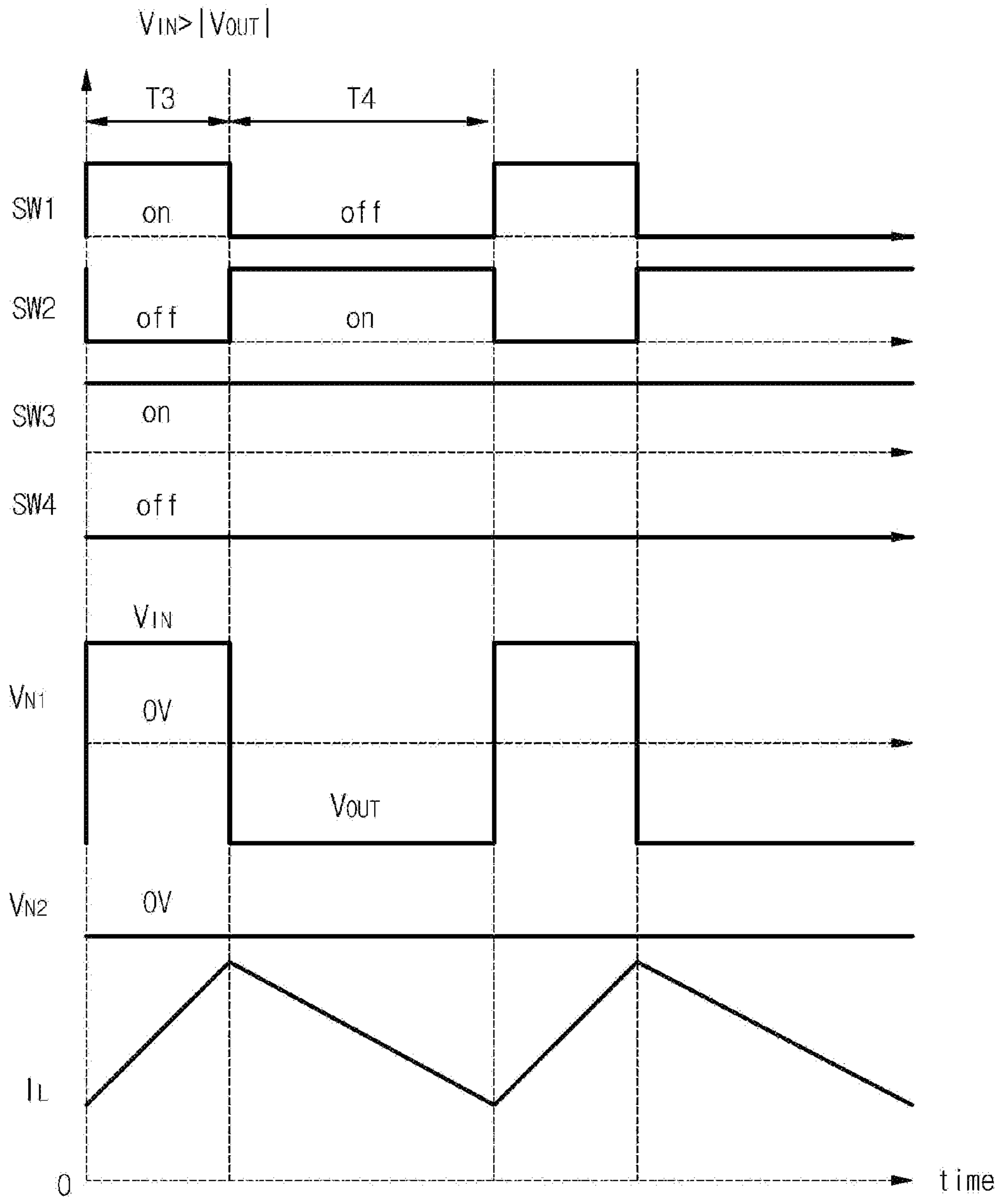
FIG. 6 is an operation timing diagram when the input voltage is greater than the absolute value of the output voltage in the buck-boost converter in accordance with the first exemplary embodiment of the present application.

FIG. 5 is a diagram illustrating a current loop generated when the input voltage $V_{IN}$ is greater than an absolute value of the output voltage $V_{OUT}$ in the buck-boost converter in accordance with the first exemplary embodiment of the present application, and FIG. 6 is an operation timing diagram when the input voltage $V_{IN}$ is greater than the absolute value of the output voltage $V_{OUT}$ in the buck-boost converter in accordance with the first exemplary embodiment of the present application. In one or more embodiments, the operation timings of the first switch SW1, the second switch SW2, the third switch SW3 and the fourth switch SW4 are controlled by a control unit (not illustrated) to be turned on and off.

Referring further to FIGS. 5 and 6, when the input voltage $V_{IN}$ is greater than the absolute value of the output voltage $V_{OUT}$, during a third time T3, the first switch SW1 and the third switch SW3 are turned on and the second switch SW2 and the fourth switch SW4 are turned off and thus a current loop 1 is generated. Accordingly, the voltage of the first terminal N1 of the inductor L connected to the input terminal $V_{IN}$ rises to the input voltage $V_{IN}$ and the voltage of the second terminal N2 of the inductor L connected to the ground terminal is maintained at the ground level, so that the process in which the inductor current $I_L$ gradually rises and the inductor L is charged with energy is performed.

During a fourth time T4 following the third time T3, the second switch SW2 and the third switch SW3 are turned on, the first switch SW1 and the fourth switch SW4 are turned off, and thus a current loop 2 is generated. Accordingly, the voltage of the first terminal N1 of the inductor L connected to the output terminal $V_{OUT}$ falls to the output voltage $V_{OUT}$ and the voltage of the second terminal N2 of the inductor L connected to the ground terminal is maintained at the ground level, so that the process in which the inductor current $I_L$ gradually falls and the energy charged in the inductor L is discharged is performed.

An operation when the input voltage $V_{IN}$ is less than the absolute value of the output voltage $V_{OUT}$ will be described. In one or more embodiments, the operation timings of the first switch SW1, the second switch SW2, the third switch SW3 and the fourth switch SW4 are controlled by a control unit (not illustrated) to be turned on and off.

Figure 7:
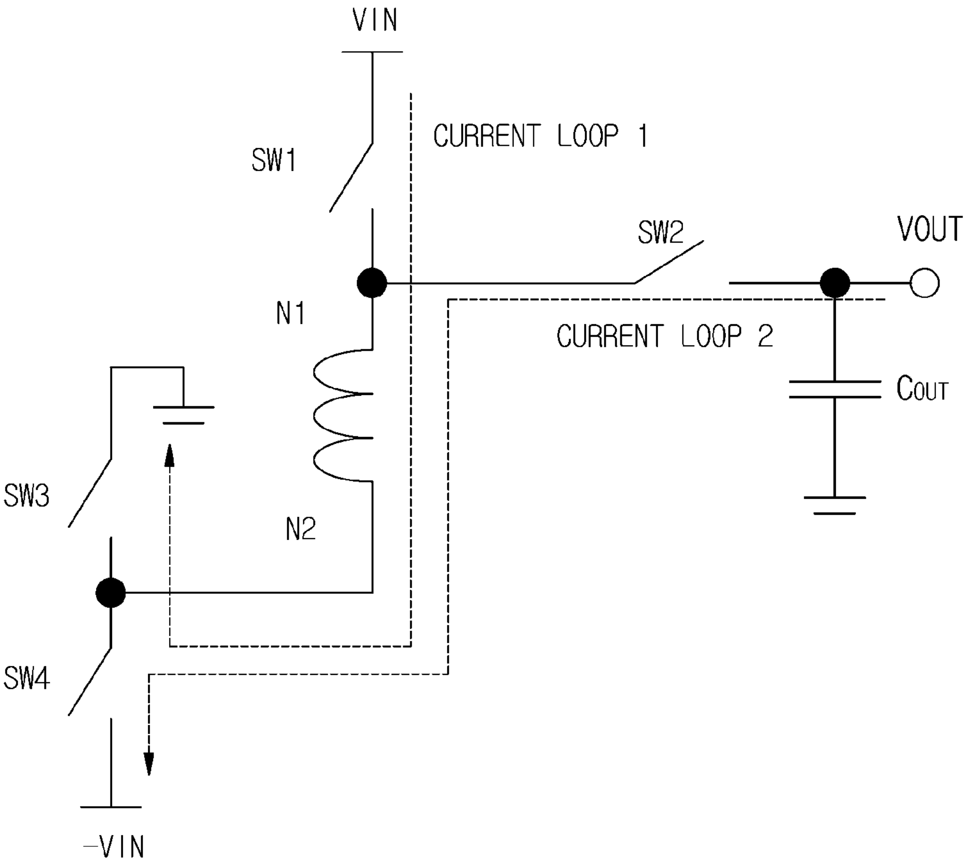
FIG. 7 is a diagram illustrating a current loop generated when the input voltage is less than the absolute value of the output voltage in the buck-boost converter in accordance with the first exemplary embodiment of the present application.
Figure 8:
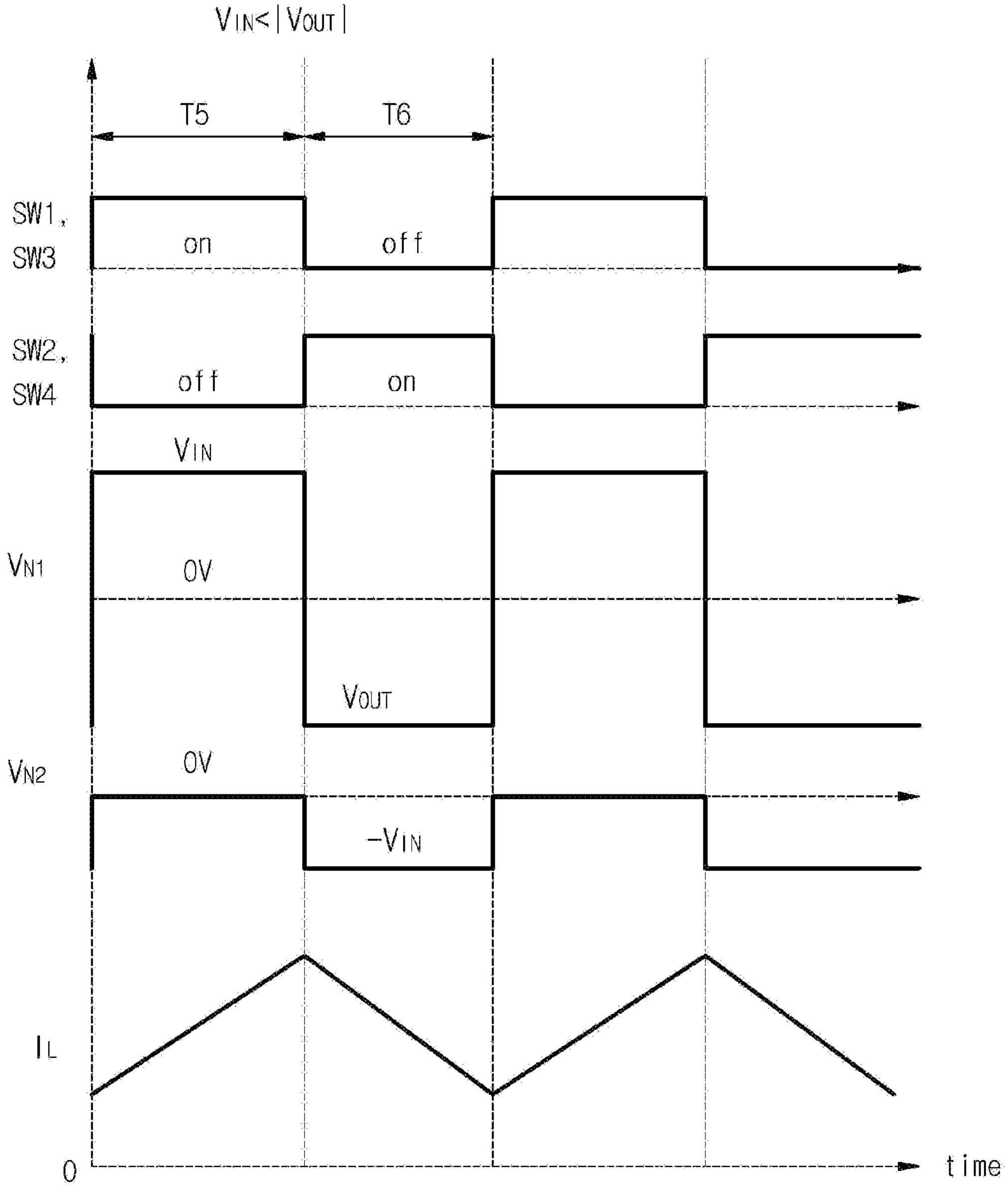
FIG. 8 is an operation timing diagram when the input voltage is less than the absolute value of the output voltage in the buck-boost converter in accordance with the first exemplary embodiment of the present application.

FIG. 7 is a diagram illustrating a current loop generated when the input voltage $V_{IN}$ is less than the absolute value of the output voltage $V_{OUT}$ in the buck-boost converter in accordance with the first exemplary embodiment of the present application, and FIG. 8 is an operation timing diagram when the input voltage $V_{IN}$ is less than the absolute value of the output voltage $V_{OUT}$ in the buck-boost converter in accordance with the first exemplary embodiment of the present application.

Referring further to FIG. 7 and FIG. 8, when the input voltage $V_{IN}$ is less than the absolute value of the output voltage $V_{OUT}$, during a fifth time T5, the first switch SW1 and the third switch SW3 are turned on and the second switch SW2 and the fourth switch SW4 are turned off and thus a current loop 1 is generated. Accordingly, the voltage of the first terminal N1 of the inductor L connected to the input terminal $V_{IN}$ rises to the input voltage $V_{IN}$, and the voltage of the second terminal N2 of the inductor L connected to the ground terminal rises to the ground level, so that the process in which the inductor current $I_L$ gradually rises, and the inductor L is charged with energy is performed.

During a sixth time T6 following the fifth time T5, the second switch SW2 and the fourth switch SW4 are turned on, the first switch SW1 and the third switch SW3 are turned off, and thus a current loop 2 is generated. Accordingly, the voltage of the first terminal N1 of the inductor L connected to the output terminal $V_{OUT}$ falls to the output voltage $V_{OUT}$ and the voltage of the second terminal N2 of the inductor L connected to the inverting input terminal −VIN falls to the inverted input voltage $-V_{IN}$, so that the process in which the inductor current $I_L$ gradually falls and the energy charged in the inductor L is discharged is performed.

Figure 9:
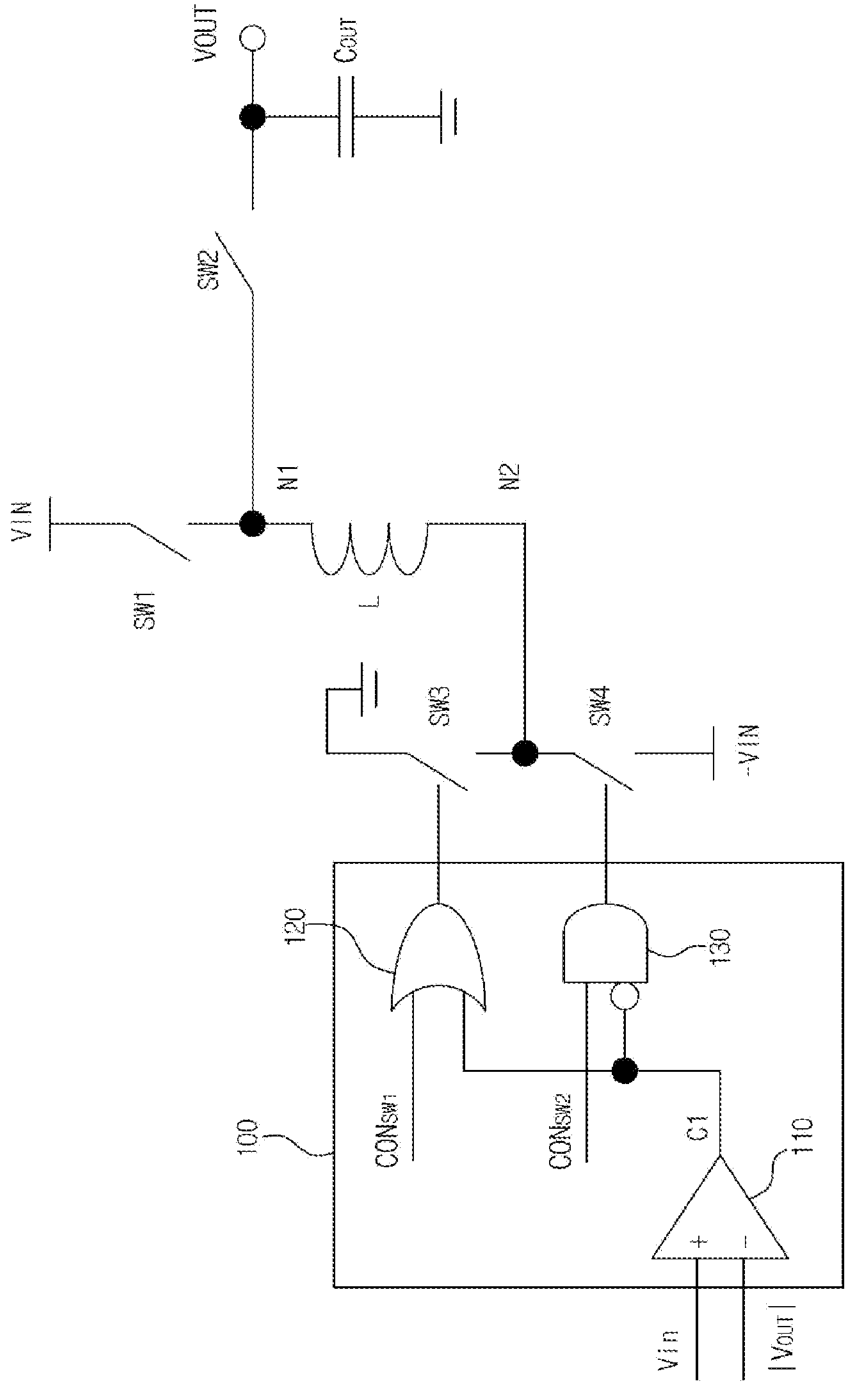
FIG. 9 is a diagram illustrating a buck-boost converter in accordance with a second exemplary embodiment of the present application.

FIG. 9 is a diagram illustrating a buck-boost converter in accordance with a second exemplary embodiment of the present application.

Referring to FIG. 9, the buck-boost converter in accordance with the second exemplary embodiment of the present application is configured to include an inductor L, an output capacitor $C_{OUT}$, a first switch SW1, a second switch SW2, a third switch SW3, a fourth switch SW4 and a controller 100.

In one or more embodiments, the first switch SW1, the second switch SW2, the third switch SW3 and the fourth switch SW4 may be field effect transistors, but are not limited thereto.

The inductor L is connected in series between a connection terminal of the first switch SW1 and the second switch SW2 and a connection terminal of the third switch SW3 and the fourth switch SW4. That is, a first terminal N1 of the inductor L is connected to the connection terminal of the first switch SW1 and the second switch SW2, and a second terminal N2 of the inductor L is connected to the connection terminal of the third switch SW3 and the fourth switch SW4.

The output capacitor $C_{OUT}$ is connected between an output terminal $V_{OUT}$ from which an output voltage $V_{OUT}$ is output and a ground terminal. The first switch SW1 is connected between an input terminal $V_{IN}$ to which an input voltage $V_{IN}$ is input and the first terminal N1 of the inductor L. The second switch SW2 is connected between the first terminal N1 of the inductor L and the output terminal $V_{OUT}$ from which the output voltage $V_{OUT}$ is output. The third switch SW3 is connected between the second terminal N2 of the inductor L and a ground terminal. The fourth switch SW4 is connected between the second terminal N2 of the inductor L and an inverting input terminal –VIN to which an inverted input voltage $-V_{IN}$ obtained by inverting the input voltage $V_{IN}$ is input. The controller 100 controls operation timings of the first switch SW1, the second switch SW2, the third switch SW3 and the fourth switch SW4.

More specifically, the controller 100 controls a rising slope and a falling slope of the inductor current $I_L$ by adjusting operating timings of the third switch SW3 and the fourth switch SW4 according to a comparison result of the input voltage $V_{IN}$ and an absolute value of the output voltage $V_{OUT}$.

For example, the controller 100 may be configured to include a comparator 110, an OR operation device 120 and an AND operation device 130.

The comparator 110 outputs a comparison result signal C1 of the input voltage $V_{IN}$ and the output voltage $V_{OUT}$.

The OR operation device 120 outputs a value, obtained by performing an OR operation of a control signal $CON_{SW1}$ of the first switch SW1 and the comparison result signal C1 output by the comparator 110, as a control signal of the third switch SW3.

The AND operation device 130 outputs a value, obtained by performing an AND operation of a control signal $CON_{SW2}$ of the second switch SW2 and a signal obtained by inverting the comparison result signal C1 output by the comparator 110, as a control signal of the fourth switch SW4.

For example, a configuration may be made such that, when the input voltage $V_{IN}$ is less than the absolute value of the output voltage $V_{OUT}$, the comparison result signal C1 output by the comparator 110 is at a low level, the third switch SW3 is switched in synchronization with the first switch SW1 and the fourth switch SW4 is switched in synchronization with the second switch SW2.

For example, a configuration may be made such that, when the input voltage $V_{IN}$ is greater than the absolute value of the output voltage $V_{OUT}$, the comparison result signal C1 output by the comparator 110 is at a high level, the third switch SW3 is turned on during an entire operating time and the fourth switch SW4 is turned off during the entire operating time.

Hereinafter, by referring further to FIGS. 10 to 13, specific and exemplary operations of the buck-boost converter according to the second exemplary embodiment of the present application will be described in connection with levels of the input voltage $V_{IN}$ and the output voltage $V_{OUT}$.

An operation when the input voltage $V_{IN}$ is greater than the absolute value of the output voltage $V_{OUT}$ will be described.

Figure 10:
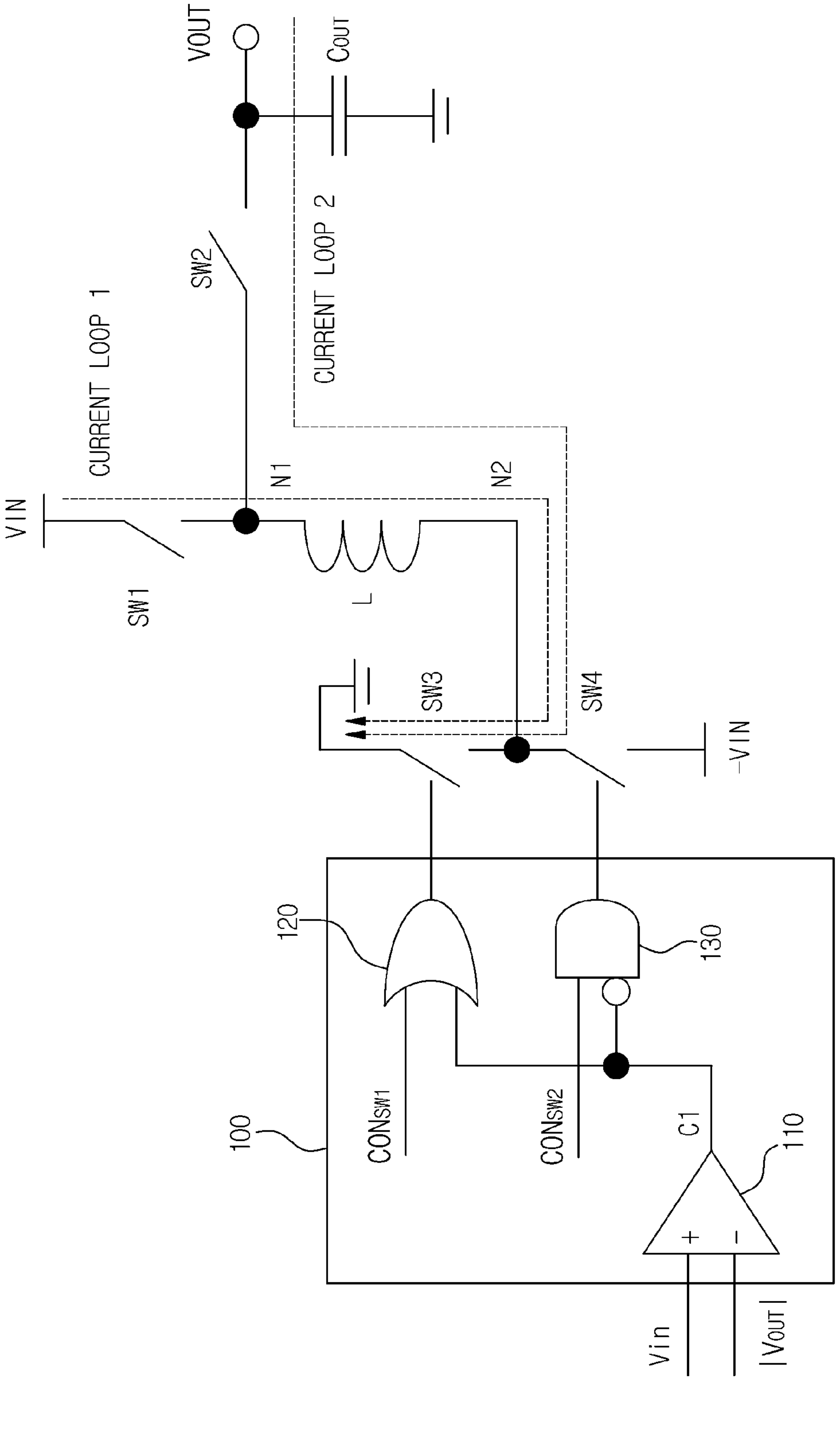
FIG. 10 is a diagram illustrating a current loop generated when an input voltage is greater than an absolute value of an output voltage in the buck-boost converter in accordance with the second exemplary embodiment of the present application.

FIG. 10 is a diagram illustrating a current loop generated when the input voltage $V_{IN}$ is greater than the absolute value of the output voltage $V_{OUT}$ in the buck-boost converter in accordance with the second exemplary embodiment of the present application and FIG. 6 is an operation timing diagram when the input voltage $V_{IN}$ is greater than the absolute value of the output voltage $V_{OUT}$ in the buck-boost converter in accordance with the second exemplary embodiment of the present application.

Figure 11:
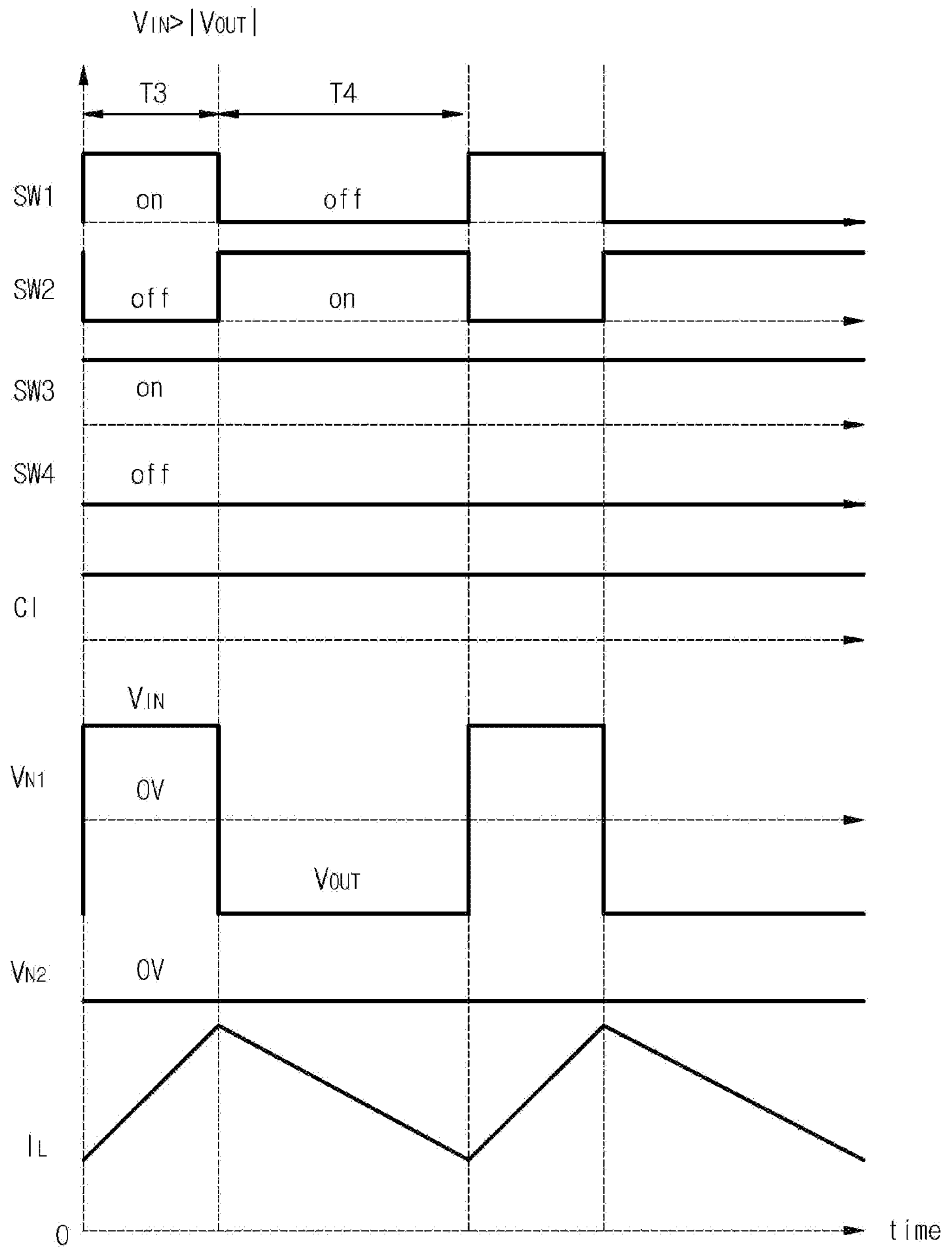
FIG. 11 is an operation timing diagram when the input voltage is greater than the absolute value of the output voltage in the buck-boost converter in accordance with the second exemplary embodiment of the present application.

Referring further to FIGS. 10 and 11, when the input voltage $V_{IN}$ is greater than the absolute value of the output voltage $V_{OUT}$, during a third time T3, the controller 100 turns on the first switch SW1 and the third switch SW3 and turns off the second switch SW2 and the fourth switch SW4 to generate a current loop 1. Accordingly, the voltage of the first terminal N1 of the inductor L connected to the input terminal $V_{IN}$ rises to the input voltage $V_{IN}$ and the voltage of the second terminal N2 of the inductor L connected to the ground terminal is maintained at a ground level, so that the inductor current $I_L$ gradually rises, and the inductor L is charged with energy.

During a fourth time T4 following the third time T3, the controller 100 turns on the second switch SW2 and the third switch SW3 and turns off the first switch SW1 and the fourth switch SW4 to generate a current loop 2. Accordingly, the voltage of the first terminal N1 of the inductor L connected to the output terminal $V_{OUT}$ fall to the output voltage $V_{OUT}$ and the voltage of the second terminal N2 of the inductor L connected to the ground terminal is maintained at the ground level, so that the inductor current $I_L$ gradually falls and the energy charged in the inductor L is discharged.

An operation when the input voltage $V_{IN}$ is less than the absolute value of the output voltage $V_{OUT}$ will be described.

Figure 12:
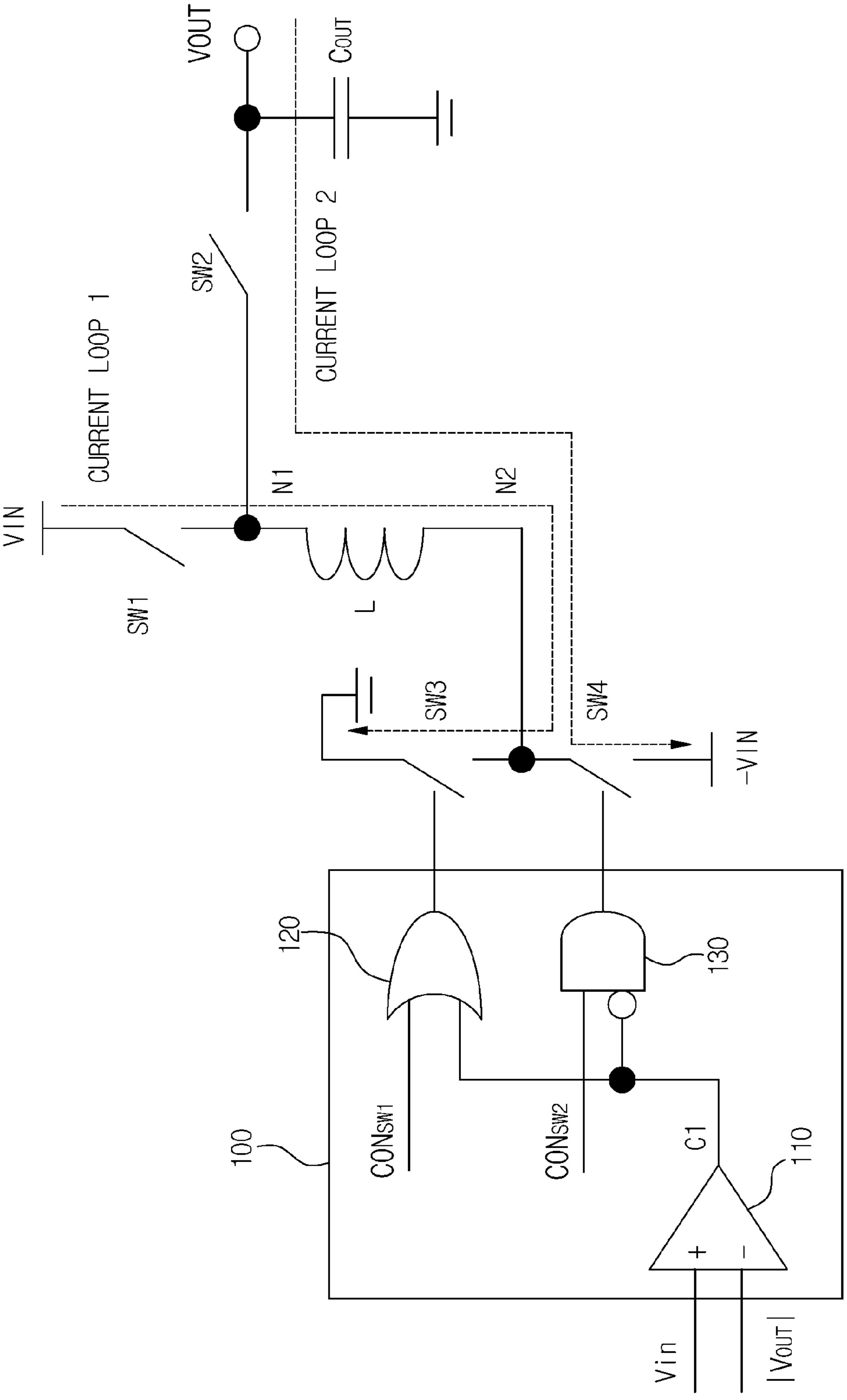
FIG. 12 is a diagram illustrating a current loop generated when the input voltage is less than the absolute value of the output voltage in the buck-boost converter in accordance with the second exemplary embodiment of the present application.
Figure 13:
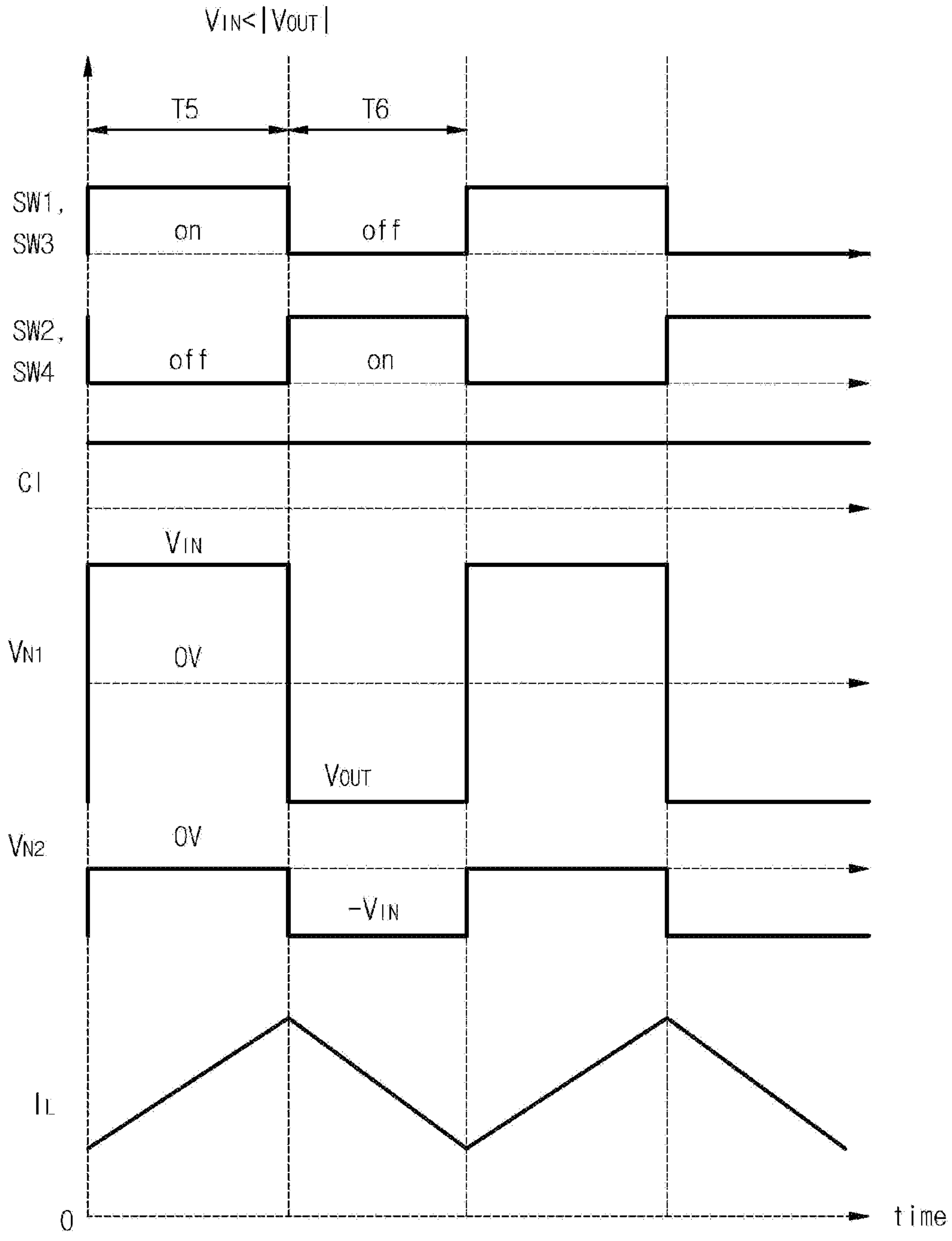
FIG. 13 is an operation timing diagram when the input voltage is less than the absolute value of the output voltage in the buck-boost converter in accordance with the second exemplary embodiment of the present application.

FIG. 12 is a diagram illustrating a current loop generated when the input voltage $V_{IN}$ is less than the absolute value of the output voltage $V_{OUT}$ in the buck-boost converter in accordance with the second exemplary embodiment of the present application; and FIG. 13 is an operation timing diagram when the input voltage $V_{IN}$ is less than the absolute value of the output voltage $V_{OUT}$ in the buck-boost converter in accordance with the second exemplary embodiment of the present application.

Referring further to FIG. 12 and FIG. 13, when the input voltage $V_{IN}$ is less than the absolute value of the output voltage $V_{OUT}$, during a fifth time T5, the controller 100 turns on the first switch SW1 and the third switch SW3 and turns off the second switch SW2 and the fourth switch SW4 to generate a current loop 1. Accordingly, the voltage of the first terminal N1 of the inductor L connected to the input terminal $V_{IN}$ rises to the input voltage $V_{IN}$ and the voltage of the second terminal N2 of the inductor L connected to the ground terminal rises to the ground level, so that the inductor current $I_L$ gradually rises, and the inductor L is charged with energy.

During a sixth time T6 following the fifth time T5, the controller 100 turns on the second switch SW2 and the fourth switch SW4 and turns off the first switch SW1 and the third switch SW3 to generate a current loop 2. Accordingly, the voltage of the first terminal N1 of the inductor L connected to the output terminal $V_{OUT}$ falls to the output voltage $V_{OUT}$ and the voltage of the second terminal N2 of the inductor L connected to the inverting input terminal –VIN falls to the inverted input voltage $-V_{IN}$, so that the inductor current $I_L$ gradually falls, and the energy charged in the inductor L is discharged.

Figure 14:
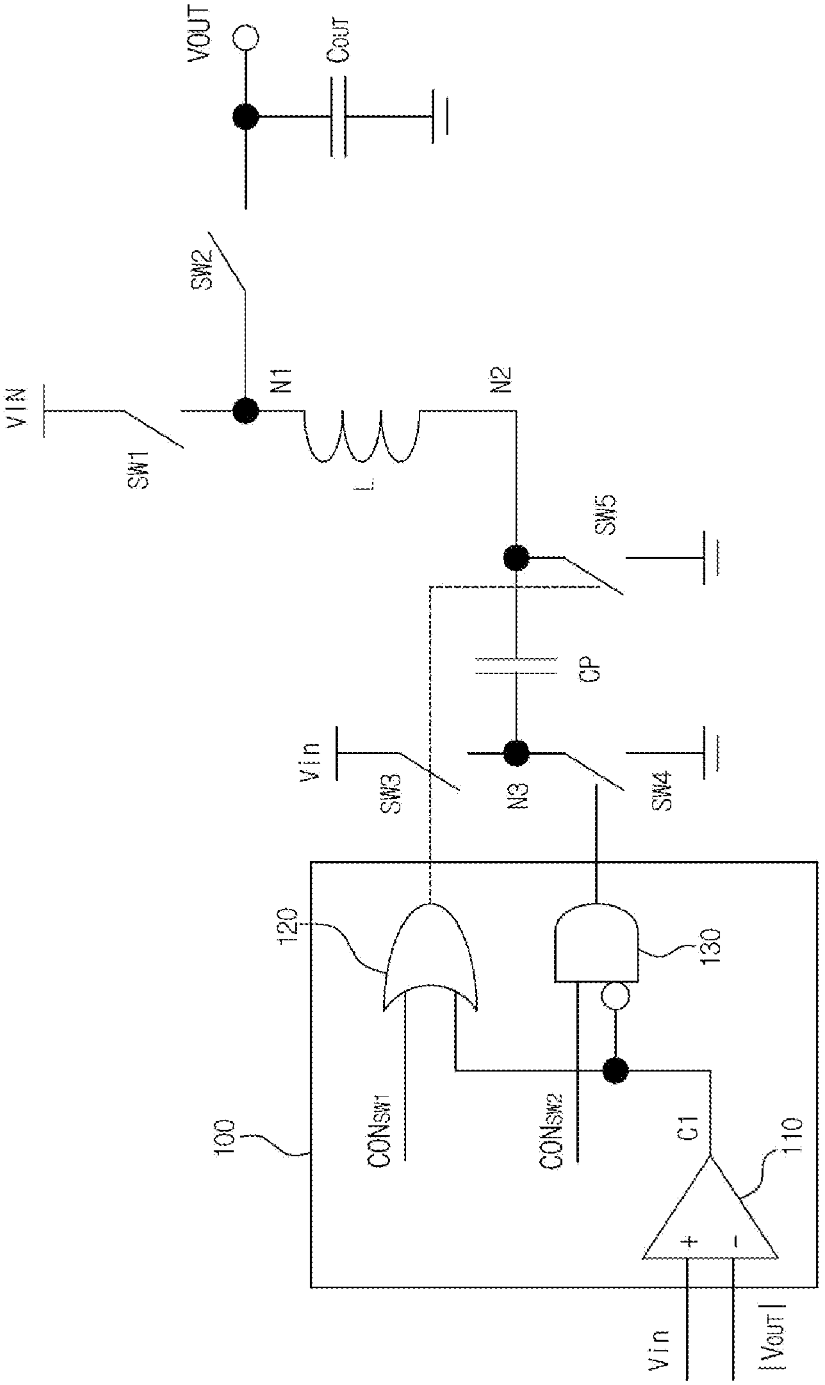
FIG. 14 is a diagram illustrating a buck-boost converter in accordance with a third exemplary embodiment of the present application.

FIG. 14 is a diagram illustrating a buck-boost converter in accordance with a third exemplary embodiment of the present application.

Referring to FIG. 14, the buck-boost converter in accordance with the third embodiment of the present application includes an inductor L, an output capacitor $C_{OUT}$, a first switch SW1, a second switch SW2, a third switch SW3, a fourth switch SW4, a charge pump capacitor CP, a charge pump switch SW5 and a controller 100.

In one or more embodiments, the first switch SW1, the second switch SW2, the third switch SW3 and the fourth switch SW4 may be field effect transistors, but are not limited thereto.

The inductor L is connected in series between a connection terminal of the first switch SW1 and second and SW2 and the charge pump capacitor CP. That is, a first terminal N1 of the inductor L is connected to the connection terminal of the first switch SW1 and the second switch SW2, and the second terminal N2 of the inductor L is connected to one terminal among both terminals of the charge pump capacitor CP.

The output capacitor $C_{OUT}$ is connected between an output terminal $V_{OUT}$ from which an output voltage $V_{OUT}$ is output and a ground terminal. The first switch SW1 is connected between an input terminal $V_{IN}$ to which an input voltage $V_{IN}$ is input and the first terminal N1 of the inductor L. The second switch SW2 is connected between the first terminal N1 of the inductor L and the output terminal $V_{OUT}$ from which the output voltage $V_{OUT}$ is output. The third switch SW3 and the fourth switch SW4 are connected in series between the input terminal $V_{IN}$ and the ground terminal, and a connection terminal of the third switch SW3 and the fourth switch SW4, that is, a third terminal located between the third switch SW3 and the fourth switch SW4 is connected to the other terminal of the charge pump capacitor CP.

The charge pump capacitor CP is connected between the third terminal located between the third switch SW3 and fourth switch SW4 and the second terminal N2 of the inductor L. That is, one terminal of the charge pump capacitor CP is connected to the second terminal N2 of the inductor L and the other terminal of the charge pump capacitor CP is connected to the third terminal located between the third switch SW3 and the fourth switch SW4.

The charge pump switch SW5 is connected between the second terminal N2 of the inductor L and a ground terminal. In other words, the charge pump switch SW5 is connected between one terminal of the charge pump capacitor CP connected to the second terminal N2 of the inductor L and the ground terminal. The controller 100 controls operation timings of the first switch SW1, the second switch SW2, the third switch SW3, the fourth switch SW4 and the charge pump switch SW5.

More specifically, the controller 100 controls a rising slope and a falling slope of the inductor current $I_L$ by adjusting operating timings of the third switch SW3, the fourth switch SW4 and the charge pump capacitor CP according to a comparison result of the input voltage $V_{IN}$ and an absolute value of the output voltage $V_{OUT}$.

For example, the controller 100 may be configured to include a comparator 110, an OR operation device 120, and an AND operation device 130.

The comparator 110 outputs a comparison result signal C1 of the input voltage $V_{IN}$ and an absolute value of the output voltage $V_{OUT}$.

The OR operation device 120 outputs a value, obtained by performing an OR operation of a control signal $CON_{SW1}$ of the first switch SW1 and the comparison result signal C1 output by the comparator 110, as a control signal of the third switch SW3 and the charge pump switch SW5.

The AND operation device 130 outputs a value, obtained by performing an AND operation of a control signal $CON_{SW2}$ of the second switch SW2 and a signal obtained by inverting the comparison result signal C1 output by the comparator 110, as a control signal of the fourth switch SW4.

In one or more embodiments, a configuration may be made such that, when the input voltage $V_{IN}$ is less than the absolute value of the output voltage $V_{OUT}$, the comparison result signal C1 output by the comparator 110 is at a low level, the third switch SW3 and the charge pump switch SW5 are switched in synchronization with the first switch SW1, and the fourth switch SW4 is switched in synchronization with the second switch SW2.

In yet another embodiment, a configuration may be made such that, when the input voltage $V_{IN}$ is greater than the absolute value of the output voltage $V_{OUT}$, the comparison result signal C1 output by the comparator 110 is at a high level, the third switch SW3 and the charge pump switch SW5 are turned on during an entire operating time, and the fourth switch SW4 is turned off during the entire operating time.

As described in detail above, according to the present application, there is an effect of providing an inverting buck-boost converter capable of achieving high efficiency and reduced heat generation in a wide input/output voltage range by detecting an input/output voltage and changing a switching control method of a circuit according to an input/output voltage relationship.

Specifically, there is an effect of capable of achieving high efficiency and reducing heat generation by greatly reducing the voltage and current applied to the inductor compared to those of a general inverting buck-boost converter circuit, by using a control method of detecting an operating region ($V_{IN}<|V_{OUT}|$) in which the inductor current greatly increases and driving the voltages across the charge pump composed of a charge pump capacitor and a charge pump switch in phase with the inductor voltage In addition, there is an effect of providing an inverting buck-boost converter capable of reducing the overall area and cost of a system by using an inductor and a capacitor having physically smaller sizes than conventional ones.

Although the buck-boost converter reducing inductor current has been described with reference to the specific embodiments, it is not limited thereto. Therefore, it will be readily understood by those skilled in the art that various modifications and changes can be made thereto without departing from the spirit and scope of the present application defined by the appended claims.

What is claimed is:

1. A buck-boost converter comprising:

a first switch connected between an input terminal to which an input voltage is input and a first terminal of an inductor;

a second switch connected between the first terminal of the inductor and an output terminal that outputs an output voltage;

a third switch connected between a second terminal of the inductor and a ground terminal, wherein the third switch receives a voltage substantially equal to the voltage at the ground terminal; and a fourth switch connected between the second terminal of the inductor and an inverting input terminal to which an inverted input voltage obtained by inverting the input voltage is input, wherein the output voltage is generated according to the input voltage, the inverted input voltage, and status of the first switch, the second switch, the third switch, and the fourth switch, during a first time, an inductor current in the inductor gradually rises, when the first switch and the third switch are turned on, the second switch and the fourth switch are turned off, a voltage of the first terminal of the inductor rises to the input voltage, and a voltage of the second terminal of the inductor is maintained at a ground level, and during a second time following the first time, the inductor current gradually falls, when the second switch and the fourth switch are turned on, the first switch and the third switch are turned off, the voltage of the first terminal of the inductor falls to the output voltage, and the voltage of the second terminal of the inductor falls to the inverted input voltage.

2. The buck-boost converter of claim 1, wherein when the input voltage is greater than an absolute value of the output voltage, during a third time, the inductor current gradually rises, when the first switch and the third switch are turned on, the second switch and the fourth switch are turned off, the voltage of the first terminal of the inductor rises to the input voltage, and the voltage of the second terminal of the inductor is maintained at the ground level, and during a fourth time following the third time, the inductor current gradually falls, when the second switch and the third switch are turned on, the first switch and the fourth switch are turned off, the voltage of the first terminal of the inductor falls to the output voltage, and the voltage of the second terminal of the inductor is maintained at the ground level.

3. The buck-boost converter of claim 2, wherein when the input voltage is less than the absolute value of the output voltage, during a fifth time, the inductor current gradually rises, when the first switch and the third switch are turned on, the second switch and the fourth switch are turned off, the voltage of the first terminal of the inductor rises to the input voltage, and the voltage of the second terminal of the inductor rises to the ground level, and during a sixth time following the fifth time, the inductor current gradually falls, the second switch and the fourth switch are turned on, the first switch and the third switch are turned off, the voltage of the first terminal of the inductor falls to the output voltage, and the voltage of the second terminal of the inductor falls to the inverted input voltage.

4. A buck-boost converter comprising:

a first switch connected between an input terminal to which an input voltage is input and a first terminal of an inductor;

a second switch connected between the first terminal of the inductor and an output terminal that outputs an output voltage;

a third switch connected between a second terminal of the inductor and a ground terminal, wherein the third switch receives a voltage substantially equal to the voltage at the ground terminal;

a fourth switch connected between the second terminal of the inductor and an inverting input terminal to which an inverted input voltage obtained by inverting the input voltage is input; and a controller configured to control a rising slope and a falling slope of an inductor current by adjusting operating timings of the third switch and the fourth switch according to a comparison result of the input voltage and an absolute value of the output voltage, wherein the output voltage is generated according to the input voltage, the inverted input voltage, and status of the first switch, the second switch, the third switch, and the fourth switch, the controller comprises:

a comparator configured to output a comparison result signal of the input voltage and an absolute value of the output voltage, an OR operation device configured to output a value, obtained by performing an OR operation of a control signal of the first switch and the comparison result signal, as a control signal of the third switch, and an AND operation device configured to output a value, obtained by performing an AND operation of a control signal of the second switch and an inverted comparison result signal obtained by inverting the comparison result signal, as a control signal of the fourth switch.

5. The buck-boost converter of claim 4, wherein when the input voltage is less than the absolute value of the output voltage, the comparison result signal output by the comparator is at a low level, and the third switch is switched in synchronization with the first switch, and the fourth switch is switched in synchronization with the second switch.

6. The buck-boost converter of claim 5, wherein when the input voltage is greater than the absolute value of the output voltage, the comparison result signal output by the comparator is at a high level, and the third switch is turned on during an entire operating time and the fourth switch is turned off during the entire operating time.

7. The buck-boost converter of claim 4, wherein when the input voltage is greater than the absolute value of the output voltage, during a third time, the inductor current gradually rises, when the controller turns on the first switch and the third switch and turns off the second switch and the fourth switch, a voltage of the first terminal of the inductor rises to the input voltage, and a voltage of the second terminal of the inductor is maintained at a ground level, and during a fourth time following the third time, the inductor current gradually falls, when the controller turns on the second switch and the third switch and turns off the first switch and the fourth switch, the voltage of the first terminal of the inductor falls to the output voltage, and the voltage of the second terminal of the inductor is maintained at a ground level.

8. The buck-boost converter of claim 4, wherein when the input voltage is less than the absolute value of the output voltage, during a fifth time, the inductor current gradually rises, when the controller turns on the first switch and the third switch and turns off the second switch and the fourth switch, a voltage of the first terminal of the inductor rises to the input voltage, and a voltage of the second terminal of the inductor rises to a ground level, and during a sixth time following the fifth time, the inductor current gradually falls, when the controller turns on the second switch and the fourth switch and turns off the first switch and the third switch, the voltage of the first terminal of the inductor falls to the output voltage, and the voltage of the second terminal of the inductor falls to the inverted input voltage.

9. A buck-boost converter comprising:

a first switch connected between an input terminal that receives an input voltage and a first terminal of an inductor;

a second switch connected between the first terminal of the inductor and an output terminal that outputs an output voltage;

a third switch and a fourth switch connected in series between the input terminal and a ground terminal;

a charge pump capacitor connected between a third terminal, which is positioned between the third switch and the fourth switch, and a second terminal of the inductor;

a charge pump switch connected between the second terminal of the inductor and a ground terminal; and a controller configured to control a rising slope and a falling slope of an inductor current by adjusting operating timings of the third switch, the fourth switch, and the charge pump capacitor according to a comparison result of the input voltage and an absolute value of the output voltage.

10. The buck-boost converter of claim 9, wherein the controller comprises:

a comparator configured to output a comparison result signal of the input voltage and the output voltage, an OR operation device configured to output a value, obtained by performing an OR operation of a control signal of the first switch and the comparison result signal, as a control signal of the third switch and the charge pump switch, and an AND operation device configured to output a value, obtained by performing an AND operation of a control signal of the second switch and an inverted comparison result signal obtained by inverting the comparison result signal, as a control signal of the fourth switch.

11. The buck-boost converter of claim 10, wherein when the input voltage is less than the absolute value of the output voltage, the comparison result signal output by the comparator is at a low level, and the third switch and the charge pump switch are switched in synchronization with the first switch, and the fourth switch is switched in synchronization with the second switch.

12. The buck-boost converter of claim 11, wherein when the input voltage is greater than the absolute value of the output voltage, the comparison result signal output by the comparator is at a high level, and the third switch and the charge pump switch are turned on during an entire operating time, and the fourth switch is turned off during the entire operating time.

* * * * *